UNITED STATES PATENT OFFICE.

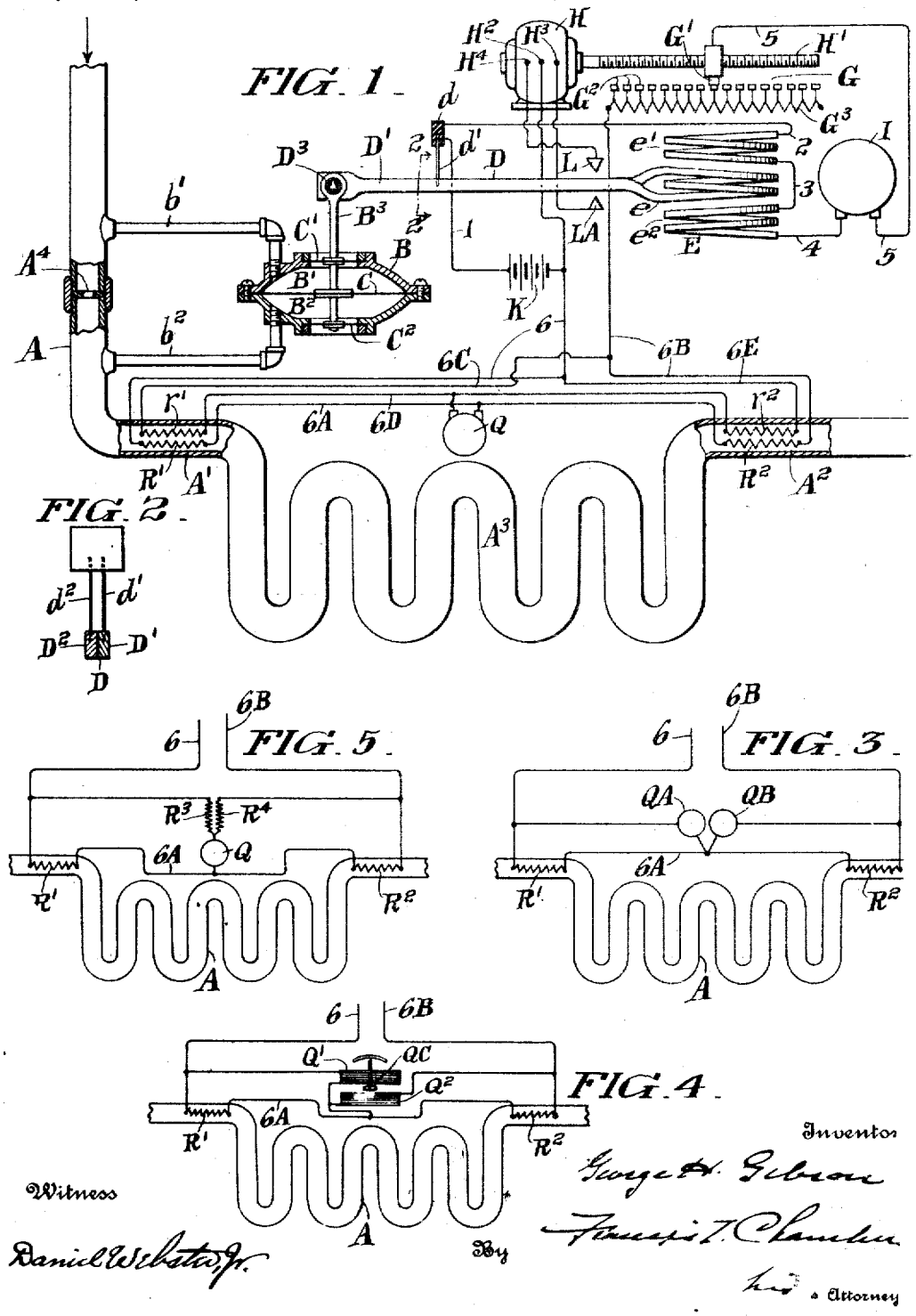

GEORGE H. GIBSON, OF MONTCLAIR, NEW JERSEY.

METHOD OF AND APPARATUS FOR HEAT DETERMINATION.

1,267,758. Specification of Letters Patent. Patented May 28, 1918.

Application filed June 10, 1916. Serial No. 103,044.

*To all whom it may concern:*

Be it known that I, GEORGE H. GIBSON, a citizen of the United States of America, and resident of Montclair, in the county of Essex and State of New Jersey, have invented a certain new and useful Improvement in Methods of and Apparatus for Heat Determination, of which the following is a true and exact description, reference being had to the accompanying drawings, which form a part thereof.

The primary object of my present invention is to provide a simple and effective method of, and apparatus for determining the amount of heat lost or absorbed by a fluid in passing between two separated points of a conduit through which the fluid passes. In carrying out my invention, I cause an electric current, proportional in strength to the quantity rate of flow of fluid through the conduit, to pass through resistance bodies which are subjected, one to the temperature of the fluid at one, and another to the temperature at the second of the conduit points between which the change in heat is to be determined, and which vary in resistance as their temperatures change by increments in linear proportion to the change in temperature, and compare the losses of potential in said resistance bodies.

As a result of proceeding in the manner set forth, the difference between the potential loss in one of the said resistances and the potential loss in the other resistance will obviously be proportional to the product of the quantity rate of fluid flow through the conduit multiplied by the difference between the temperatures of the fluid at the two points at which the resistances are located. The integrated difference between the losses in potential in the different resistances for a given period of time thus affords a direct measure of the amount of heat lost or absorbed by the fluid passing between the two points of said conduit during said period of time. The invention may be advantageously used, for example, in determining the amount of heat furnished a user supplied with heat from a central station heating plant in which the circulating medium is hot water. The invention is obviously adapted, however, for use in measuring the refrigerating effect of a cooling fluid, and for many other purposes.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred forms of apparatus and methods embodying my invention.

Of the drawings:

Figure 1 is a diagrammatic representation of one form of apparatus adapted for use in determining the heat loss or absorption of a fluid flowing through a conduit;

Fig. 2 is a partial sectional elevation taken on the line 2—2 of Fig. 1;

Fig. 3 is a diagrammatic representation of a portion of a modified form of apparatus;

Fig. 4 is a view similar in character to Fig. 3, illustrating a different modification; and Fig. 5 is also a view similar to Fig. 3 and illustrating still another modified form of apparatus.

In the drawings, and referring first to the construction shown in Figs. 1 and 2, A represents a conduit through which a fluid flows, and $A'$ and $A^2$ represent points in said conduit at the opposite sides of a portion $A^3$ thereof in which the fluid loses or absorbs heat, the quantity of which it is desirable to determine. For example, the portion $A^3$ of the conduit A may correspond to the heat radiating coils and house piping of a user supplied with heat from a central station by means of a circulating medium in the form of hot water flowing through the conduit A.

The apparatus shown in Fig. 1 comprises means for automatically maintaining an electric current flow of a strength proportional to the quantity rate of flow through the conduit A. The means employed for this purpose comprise a differential pressure device B having its high and low pressure chambers $B'$ and $B^2$ respectively, connected by pipes $b'$ and $b^2$ respectively to points in the conduit A between which a difference of pressure exists which is a function of the velocity head and hence of the rate of flow through the conduit. For example, as shown, the pipes $b'$ and $b^2$ are connected to the conduit A at the high and low pressure sides respectively, of a restricted orifice $A^4$ provided in the conduit. The differential pressure device B in the construction shown, has its chambers $B'$ and B² separated by a flexible diaphragm C. The diaphragm is connected at its center to a stem B³ which is also connected to flexible diaphragms C' and C². The latter are equal to one another in size but are smaller than the diaphragm C. The diaphragms C' and C² close apertures in the walls of the chambers B' and B² remote from the diaphragms C, and make stuffing box provisions for the stem B³ unnecessary.

The stem B³ is pivotally connected at its upper end to a lever D, to the opposite end of which is secured the movable coil $e$ of the electro-magnetic balancing device E. As shown, the lever D is formed by two metal bars D' and D² insulated from each other; and forming the terminals of the coil $e$. The lever D is suspended from a fixed support $d$ by flexible conductors $d'$ and $d^2$ connected at their lower ends to the bars D' and D² respectively. The knife-edge pivot D³ carried by the lever D and the stem B³ engaging the pivot D³ are insulated from the bars D' and D². The electro-magnetic balancing device E also comprises stationary coils $e'$ and $e^2$ coaxial with and located one above and the other below the coil $e$. When an electric current is caused to flow in series through the coils $e$, $e'$ and $e^2$ by the circuit connections hereinafter referred to, the coil $e$ is attracted by the coil $e^2$ and repelled by the coil $e'$.

The means shown for adjusting the electric current flow through the coils $e$, $e'$ and $e^2$ to impress the required variable balancing force on the lever D, comprises a rheostat G, a reversible electric motor H, and controlling provisions for operating the latter in one direction or the other in response to the movements of the lever D out of a neutral position. The rheostat G, as somewhat conventionally illustrated, comprises a contact member G' movable along and engaging one or another of the stationary contacts G² conducted at intervals to a resistance conductor G³. As shown, the member G' has a threaded passage receiving the threaded shaft H' of the motor H. The motor H in the arrangement illustrated, runs in one direction when a suitable source of electric current is connected to its terminals H² and H³, and in the opposite direction when current is supplied to the motor terminals H² and H⁴.

K represents an electric battery or other suitable source of electric current for the balancing device E and for the motor H. One terminal of the battery K is connected by the conductor 1 to the flexible support $d'$ for the lever D and thereby to the bar D' which forms one terminal of the floating coil $e$. The bar D² forming the other terminal of the coil $e$ is connected through the flexible conductor $d^2$ and the conductor 2 to one terminal of the stationary coil $e'$. The second terminal of the stationary coil $e'$ is connected by a conductor 3 to one terminal of the coil $e^2$. The second terminal of the coil $e^2$ is connected as shown, by a conductor 4 to one terminal of the ammeter I. The second terminal of the ammeter I is connected by the flexible conductor 5 to the movable element G' of the rheostat G. The resistance conductor G³ of the rheostat G is connected at one end to the second terminal of the source of current K by conductors 6 and 6B, and the multiple circuit connections between these conductors.

These multiple circuit connections comprise a resistance R' located in the conduit A at the point A', and having one terminal connected directly to the conductor 6 and its other terminal connected by the conductor 6A to one terminal of a resistance R² located in the conduit A at the point A² and having its second terminal connected directly to the conductor 6B. Also located in the conduit A at the point A' is a resistance $r'$ having one terminal connected by the conductor 6C to the conductor 6B, and having its second terminal connected by the conductor 6D to one terminal of a second resistance $r^2$ located in the conduit A at the point A². The second terminal of the conductor $r^2$ is connected by a conductor 6E to the conductor 6. Between the conductors 6A and 6D is connected an instrument Q for measuring the difference in potential between the conductors 6A and 6D. This instrument Q may be a galvanometer, a potentiometer, or some other suitable type of sensitive volt meter, and in the practical use of my invention will ordinarily be a recording instrument.

Preferably the resistance bodies R', R², $r'$ and $r^2$ are of equal resistance when at the same temperatures and each should be formed of a metal, or combination of metals, such that a change in temperature of the body will result in a change in its electrical resistance which is approximately in linear proportion to the change in temperature through the range in temperature to which the body is subjected in carrying out the invention. For example, in using the invention as illustrated to measure the heat lost in a hot water heating system, the resistance bodies may be formed of pure copper.

In operation the differential of the pressures in the chambers B' and B² will be proportional to the square of the fluid rate of flow through the orifice A⁴, and this pressure differential acting on one end of the lever D is balanced by the electro-magnetic interaction between the movable coil $e$ carried by the opposite end of the lever D and the stationary coils $e'$ and $e^2$. This electro-magnetic interaction exerts a force on the lever D which is proportional to the square of the current flowing in series through the coils $e$, $e'$ and $e^2$. As the pressure differential to which the diaphragm C is subjected increases, this moves the lever D into engagement with the contact L and causes the motor H to rotate in a direction to reduce the amount of the resistance conductor $G^2$ interposed between the conductors 6B and 5, and thus restore the balance. Similarly, on a diminution of the differential pressure on the diaphragm C, the lever D engages the contact LA and thereby causes the motor H to increase the amount of the resistance conductor $G^3$ interposed between the conductors 5 and 6B.

The apparatus shown in Fig. 1 operates automatically to maintain an electric current flow through the coils $e$, $e'$ and $e^2$ which is in linear proportion to the quantity of fluid flowing through the restricted orifice $A^4$.

Since the resistance bodies $R'$, $R^2$, $r'$ and $r^2$ all have the same resistance at the same temperature, and each varies in resistance in direct proportion to the variation in temperature to which it is subjected, one half of the balancing current of electricity flowing through the coils $e$, $e'$ and $e^2$ will pass through the resistance conductors $R'$ and $R^2$, and the other half will pass through the resistance conductors $r'$ and $r^2$. This division of the current into two equal parts will obviously be unaffected by the difference in the temperatures at the points $A'$ and $A^2$ since each of the two divided circuits includes two similar resistances subjected, one to the temperature at the point $A'$ and the other to the temperature at the point $A^2$. The potential losses in the resistance $R'$ and $r'$, will always be equal, but the potential losses in the resistance $R'$ and $R^2$ will be different in case the temperatures at the points $A'$ and $A^2$ are not the same.

Let $R_0$ represent the resistance of each of the resistance bodies $R'$, $R^2$, $r'$ and $r^2$ at zero centigrade, and let $a$ represent the increment of resistance increase for each degree of temperature increase, $T_1$ and $T_2$ the temperatures in the conduit A at the points $A'$ and $A^2$ respectively, and let C represent the balancing current of electricity flowing through coils $e$, $e'$ and $e^2$.

With these assumptions it will readily be seen that the potential difference to which the terminals of the instrument Q are subjected is equal to $$\frac{C}{2}(R_0 + aT_1) - \frac{C}{2}(R_0 + aT_2) = KC(T_1 - T_2)$$

where K is a constant and equal to $\frac{a}{2}$. In consequence the instrument Q measures a quantity proportional to the product of the amount of fluid flowing through the conduit multiplied by the change in temperature of the fluid as it passes through the conduit portion $A^3$. In other words, the instrument Q shows the amount of heat lost or absorbed and may be calibrated to directly show the number of B. T. U.'s, lost or gained.

In essence, my invention operates to determine the amount of heat gained or lost by a fluid in passing from one point to another of the conduit through which the fluid flows, and involves a comparison of the potential drop in two resistances subjected to the temperatures at said conduit points when there is passed through such resistance an electrical current which is proportional in strength to the quantity rate of flow through the conduit. The apparatus and method which may be employed to carry out the invention may differ greatly in form from those already disclosed in detail. For example, a very simple form of apparatus for effecting this comparison is illustrated in Fig. 3, wherein similar volt meters QA and QB have their terminals connected, one to the terminals of the resistance $R'$ and the other to the terminals of the resistance $R^2$, the resistances $R'$ and $R^2$ being connected to current regulating mechanism as in Fig. 1. In utilizing the apparatus shown in Fig. 3 it is necessary to take simultaneous readings of the instruments QA and QB.

The disadvantage of taking simultaneous readings is avoided in the use of the apparatus shown in Fig. 4 which differs from that shown in Fig. 3 only in that the instruments QA and QB are replaced by a single differential volt meter QC having one of its coils $Q'$ connected to the terminals of the resistance $R'$ and the other coil $Q^2$ connected to the terminals of the resistance body $R^2$.

The apparatus shown in Fig. 5 differs from that shown in Fig. 3 in that a single instrument Q is employed which has one terminal connected to the conductor 6A and the other terminal connected to the common terminal of two resistances $R^3$ and $R^4$ which are connected in series with one another and in shunt to the resistances $R'$, $R^2$ and the conductor 6A. The resistance bodies $R^3$ and $R^4$ are arranged in proximity to one another so as to be subjected to the same temperature, and these bodies should have an electrical resistance very large in comparison with the resistance of the resistance bodies $R'$ and $R^2$. In consequence, the relative resistances of the resistance bodies $R^3$ and $R^4$ will be unaffected by the temperatures to which they are subjected and the current diverted away from the resistance bodies $R'$ and $R^2$ will be so small in comparison with the current flowing through $R'$ and $R^2$ that it will be without appreciable effect on the potential differences at the terminals of the resistance bodies $R'$ and $R^2$.

In the practical use of such apparatus as is shown in Fig. 5 the resistance conductors $R^3$ and $R^4$ would really pertain to and form a part of the instrument Q, and the apparatus shown in Fig. 5 is thus a very simple and practical one.

Certain features of novelty possessed in common by the apparatus disclosed herein and by other forms of apparatus for accomplishing the same general result are claimed in my co-pending application Serial No. 134,287, filed December 1, 1916, wherein the apparatus disclosed herein and alternative constructions for accomplishing the same general result are illustrated and described.

While in accordance with the provisions of the statutes I have illustrated and described the best forms of apparatus and methods known to me for accomplishing the object of my invention, it will be apparent to those skilled in the art that my invention may be embodied in apparatus and carried out by methods differing from those specifically disclosed herein.

Having now described my invention, what I claim as new and desire to secure by Letters Patent, is:—

1. The method of determining the amount of heat lost or absorbed by a fluid in flowing between separated points in a conduit which consists in causing an electric current proportional in strength to the quantity rate of fluid flow in said conduit, to flow through resistances subjected to the temperatures of the fluid at said points and comparing the losses of potential in said resistances.

2. The combination with a conduit, of means for determining the amount of heat lost or absorbed by a fluid in flowing between separated points in said conduit comprising resistances subjected to the temperatures of the fluid at said points, means for causing an electric current proportional in strength to the quantity rate of fluid flow in said conduit to pass through said resistances, and means for comparing the losses of potential in said resistances.

3. The combination with a conduit, of means for determining the amount of heat lost or absorbed by a fluid in flowing between separated points in said conduit comprising a differential pressure device, an electro-magnetic balancing device, a motor driven rheostat controlled by said devices, resistance bodies subjected to the temperature in said conduit at said points, a source of electrical current connected in circuit with said resistances, rheostat and balancing device, and exhibiting means for comparing the losses of potential in said resistances.

GEORGE H. GIBSON.